(12) United States Patent
Kojima

(10) Patent No.: US 7,461,898 B2
(45) Date of Patent: Dec. 9, 2008

(54) VEHICLE SEAT POSITION ADJUSTING DEVICE

(75) Inventor: Yasuhiro Kojima, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 131 days.

(21) Appl. No.: 11/090,257

(22) Filed: Mar. 28, 2005

(65) Prior Publication Data

US 2005/0231016 A1 Oct. 20, 2005

(30) Foreign Application Priority Data

Mar. 30, 2004 (JP) .............................. 2004-100347

(51) Int. Cl.
*B60N 2/06* (2006.01)

(52) U.S. Cl. ...................... 297/341; 297/367

(58) Field of Classification Search ................ 297/341, 297/344.11, 367

See application file for complete search history.

(56) References Cited

U.S. PATENT DOCUMENTS

| | | | |
|---|---|---|---|
| 4,025,109 A * | 5/1977 | Klingelhofer et al. ........ | 297/362 |
| 5,740,999 A | 4/1998 | Yamada | |
| 5,882,014 A | 3/1999 | Gavin | |
| 5,882,074 A * | 3/1999 | Kojima ........................ | 297/341 |
| 6,341,819 B1 * | 1/2002 | Kojima et al. ................ | 297/341 |
| 6,609,756 B2 * | 8/2003 | Kojima et al. ................ | 297/367 |
| 6,641,218 B2 | 11/2003 | Ito et al. | |
| 6,715,835 B2 * | 4/2004 | Hoshihara et al. ........... | 297/366 |
| 6,830,296 B2 * | 12/2004 | Kojima ........................ | 297/341 |

FOREIGN PATENT DOCUMENTS

| | | |
|---|---|---|
| EP | 0 872 375 A2 | 10/1998 |
| FR | 2 731 186 A1 | 9/1996 |
| JP | 10-44838 | 2/1998 |
| JP | 200265387 A * | 3/2002 |

OTHER PUBLICATIONS

European Search Report dated Apr. 6, 2006.

* cited by examiner

*Primary Examiner*—Joseph F Edell
(74) *Attorney, Agent, or Firm*—Buchanan Ingersoll & Rooney PC

(57) ABSTRACT

A vehicle seat position adjusting device includes a slide adjuster having a slide lock mechanism, a reclining adjuster, and a walk-in mechanism disposed between the slide adjuster and the reclining adjuster. The walk-in mechanism includes a detecting plate for detecting rotation of the seat back relative to the seat cushion and the reclining adjuster includes a lower plate supported by the seat cushion, an upper plate supported by the seat back and rotatably supported on the lower plate, and a supporting surface formed in the upper plate or the lower plate which rotatably supports the detecting plate without increasing an axial width of the vehicle seat adjusting device.

10 Claims, 6 Drawing Sheets

VEHICLE SEAT POSITION ADJUSTING DEVICE

CROSS REFERENCE TO RELATED APPLICATIONS

This application is based on and claims priority under 35 U.S.C. § 119 to Japanese Patent Application 2004-100347, filed on Mar. 30, 2004, the entire content of which is incorporated herein by reference.

FIELD OF THE INVENTION

This invention relates to a vehicle seat position adjusting device, and more particularly, the invention relates to a vehicle seat position adjusting device which includes a walk in mechanism that allows the frontward sliding movement of the vehicle seat relative to a vehicle floor when a seat back is forwardly rotated to a predetermined angle relative to the seat cushion.

BACKGROUND

Conventionally, the seat position adjusting device is known, for example, by a Japanese Patent Publication 10-44838 A. In this publication, the seat position adjusting device includes a slide adjuster having a slide lock mechanism for slidably supporting the vehicle seat relative to the vehicle floor and holding the seat to a predetermined position relative to the vehicle floor by restricting the slidable movement of the seat relative to the floor, a reclining adjuster provided between the slide adjuster and the reclining adjuster for rotatably supporting the seat back of the seat relative to the seat cushion of the seat around the rotational axis line and a walk in mechanism for allowing the sliding movement of the seat relative to the vehicle floor by actuating the slide lock mechanism of the slide adjuster when the seat back is rotated to a predetermined angle relative to the seat cushion.

The walk in mechanism of this publication includes a detecting plate for detecting the rotation angle of the seat back relative to the seat cushion. This detecting plate is supported at a tip end of the rotation shaft, which forms a rotation axis line for seat cushion. The detecting plate engages with the seat back and rotates together with the seat back around the rotation shaft when the seat back is rotated to a predetermined angle relative to the seat cushion. Thus the detecting plate detects the rotation of the seat back relative to the seat cushion.

According to this related art, the detecting plate is arranged protruding sideward from the reclining adjuster. This is because the detecting plate is provided at the tip end of the rotation shaft. This will require the space in sideward in seat width direction. In a very limited space in the occupant compartment, the seat size has to be limited in a seat width direction.

A need thus exists for a vehicle seat position adjusting device in which a detection plate can be provided without space in a seat width direction being sacrificed.

SUMMARY OF THE INVENTION

According to an aspect of the present invention, a vehicle seat position adjusting device includes a slide adjuster having a slide lock mechanism for slidably supporting a vehicle seat relative to a vehicle floor and holding the vehicle seat at a predetermined position relative to the vehicle floor by restricting a relative sliding movement of the vehicle seat relative to the vehicle floor, a reclining adjuster for rotatably supporting a seat back of the vehicle seat about a rotational axis line relative to a seat cushion of the vehicle seat, and a walk in mechanism disposed between the slide adjuster and the reclining adjuster for actuating the slide lock mechanism of the slide adjuster to allow the sliding movement of the vehicle seat relative to the vehicle floor when the seat back is rotated equal to or more than a predetermined angle relative to the seat cushion by operating the reclining adjuster. The walk in mechanism includes a detecting plate for detecting the predetermined angle or more than the predetermined angle rotation of the seat back relative to the seat cushion to the predetermined and the reclining adjuster includes a supporting surface arranged at an outer profile of the reclining adjuster in parallel to an extension direction of the rotational axis line of the seat back relative to the seat cushion.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
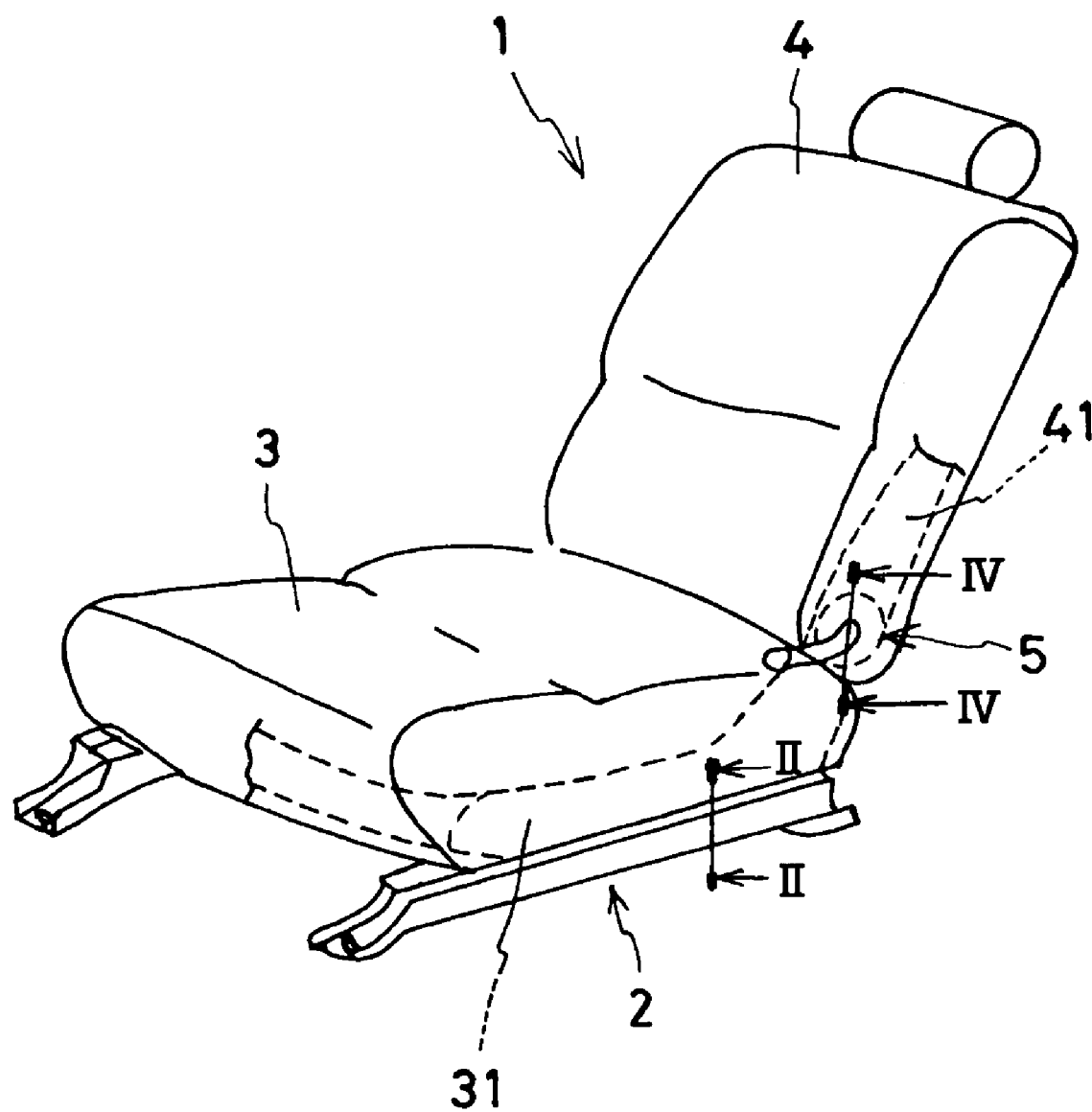
FIG. 1 shows a perspective view of the vehicle seat installed with a seat position adjusting device according to the invention.

As is illustrated in FIG. 1, the vehicle seat, positioned so as to be slidably supported by the seat adjuster 2 in a vehicle longitudinal direction relative to the vehicle floor (in a left and right direction in FIG. 1), and so as to be capable of being supported at a predetermined longitudinal adjustment position, includes a seat cushion 3 that forms a seating surface and a seat back 4 that forms a reclining seat for the back. The seat back 4 is put into position by the reclining adjuster 5 at the rear portion of the seat cushion 3 so as to be rotatably supported in a vehicle longitudinal direction relative to the seat cushion 3, and so as to be capable of being supported at a predetermined angle-adjustment position.

Figure 2:
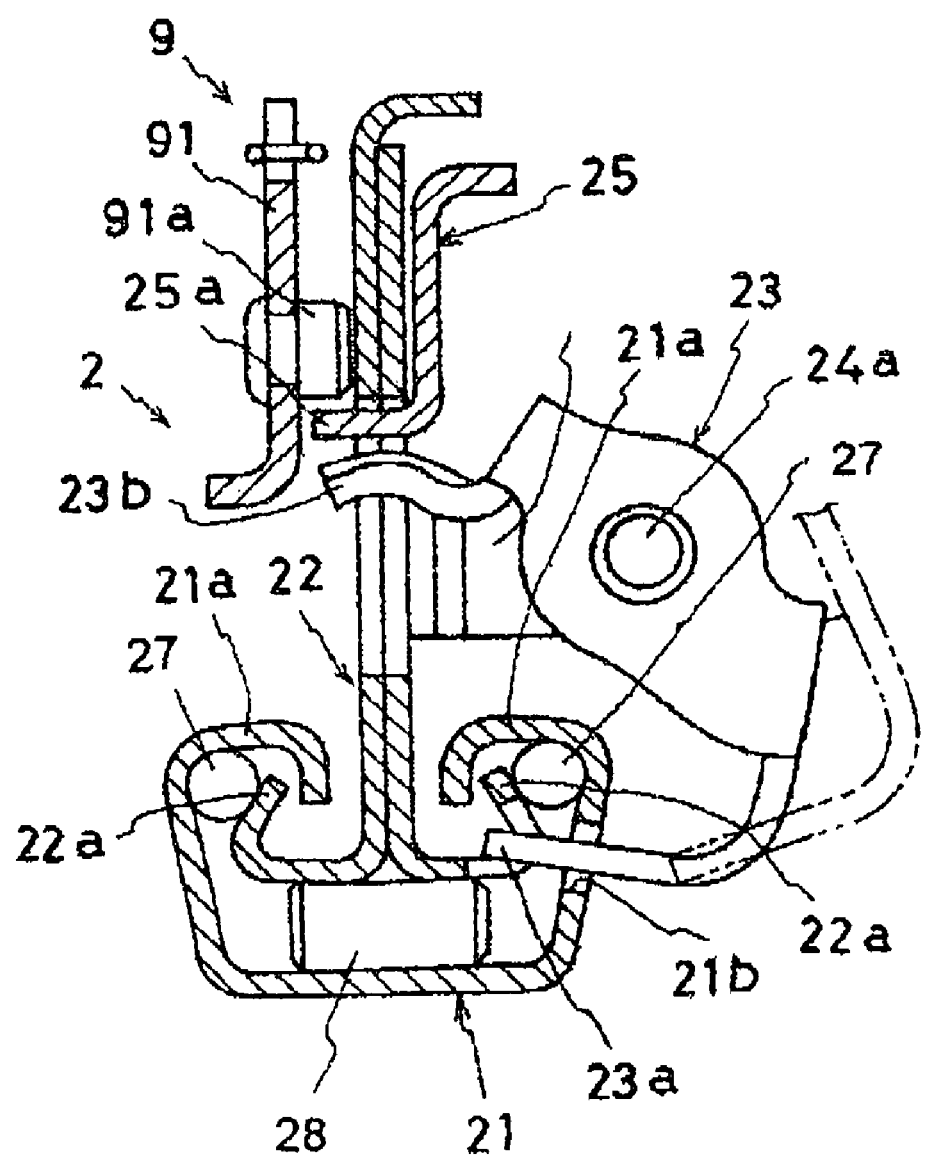
FIG. 2 shows a cross sectional view taken along the line II-II of FIG. 1.
Figure 3:
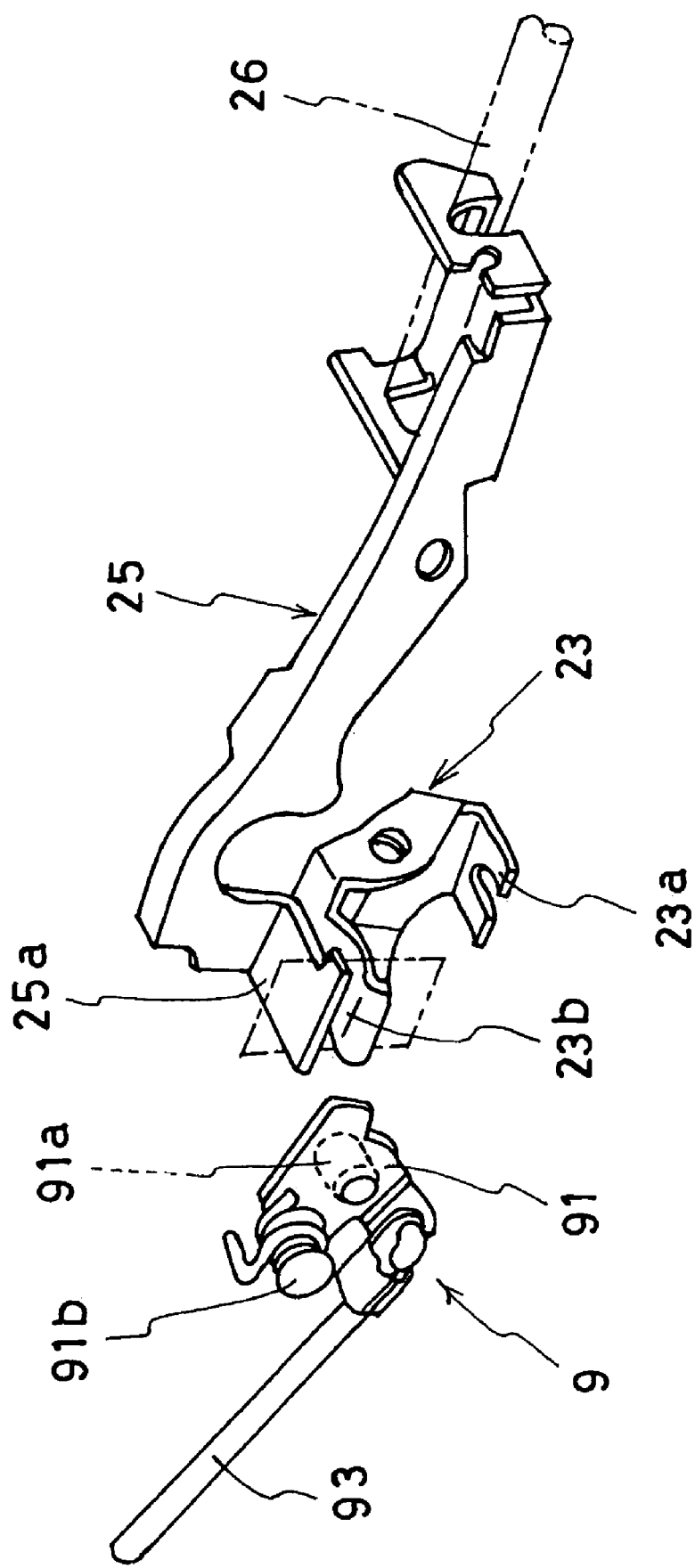
FIG. 3 shows a perspective view of the walk in mechanism of the seat position adjusting device according to the invention.

As is illustrated in FIG. 2 and FIG. 3, the seat slide adjuster 2 includes a lower rail 21, an upper rail 22 and a lock plate 23.

The lower rail 21 is of an oblong shape extending in a longitudinal direction of the seat (the same direction as the vehicle longitudinal direction mentioned above), and front and rear end portions of the lower rail are fixed to the vehicle floor. In a cross section, the lower rail 21 assumes a substantially U-shape, and a pair of engaging flanges are formed on both the right and left ends of the cross section. The upper rail is of an oblong shape extending in a longitudinal direction, and is attached to the frame 31 of the seat cushion 3 (illustrated in FIG. 1 and FIG. 6). In a cross section, the upper rail 22 assumes a substantially reverse T-shape, and a pair of engaging flanges 22a are formed on both the right and left ends of the cross section. The upper rail 22 is made to engage with engaging flanges 21a of the lower rail 21 through balls 27, and the upper rail 22 is slidably supported by the lower rail 21 in a longitudinal direction through rollers 28. The end result of this is that the vehicle seat is slidably supported relative to the vehicle floor in a vehicle longitudinal direction.

The lock plate 23 is rotatably supported in a width direction of the upper rail 22 (in a left and right direction in FIG. 2) by a supporting shaft 24a supported by a bracket 24 fixed to the upper rail 22. Multiple locking holes 21b are formed on the lower rail 21 in a longitudinal direction. An engaging hook 23a, capable of engaging with one of the lock holes 21b, are formed on the lock plate 23, and, by virtue of engagement between the one of the lock holes 21b and the engaging hook 23a, sliding movement of the upper rail 22 relative to the lower rail 21 is restricted. In consequence, the vehicle seat 1 is supported at a predetermined longitudinal adjustment position relative to the vehicle floor. Further, on the lock plate 23, an operating flange 23b that faces the engaging hook 23a is formed across the supporting shaft 24a. A first release lever 25, rotatably supported by the upper rail 22 and extending in a longitudinal direction of the rail, is connected through the operating flange 23b. The first release lever 25 is connected at one end to an operating rod 26, and at the other end pressing flange 25a is formed that presses the operating flange 23b of the lock plate 23. Moreover, when the operating lever 25 is made to rotate, the pressing flange 25a press the operating flange 23b of the lock plate 23, and the lock plate 23 rotates about the supporting shaft 24 in an anti-clockwise direction, as illustrated in FIG. 2. As a result, and as is illustrated by a broken line in FIG. 2, engagement between the engaging hook 23a of the lock plate 23 and the one of the lock holes 21b of the lower rail 21 is released. In consequence, the upper rail 22 becomes capable of sliding relative to the lower rail 21. Moreover, because the upper rail 22 is made to slide relative to the lower rail 21 in a state where engagement between the engaging hook 23 and the one of the lock holes 21b has been released, the vehicle seat 1 is made to slide in a vehicle longitudinal direction relative to the vehicle floor. Further, the lock plate 23 is subjected to a biasing force of a spring (not illustrated in the drawings) provided around the supporting shaft 24a, and the engaging hook 23a are consistently biased in a clockwise direction, as illustrated in FIG. 2. Moreover, by virtue of a spring positioned between the upper rail 22 and the lower rail 21, the upper rail 22 is also consistently biased so as to slide forward in a vehicle longitudinal direction relative to the lower rail 21.

Figure 4:
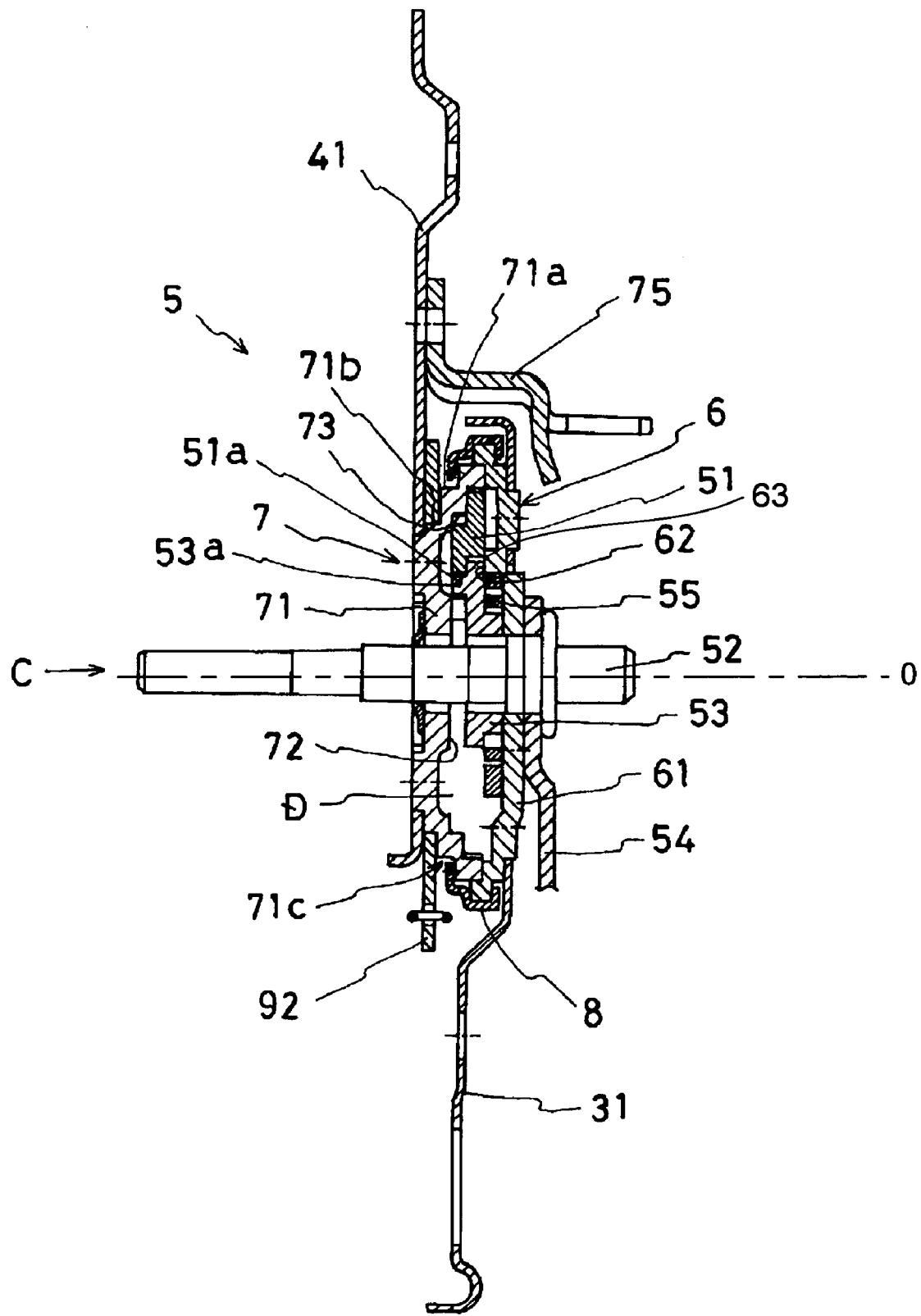
FIG. 4 shows a cross sectional view taken along the line IV-IV of FIG. 1.
Figure 5:
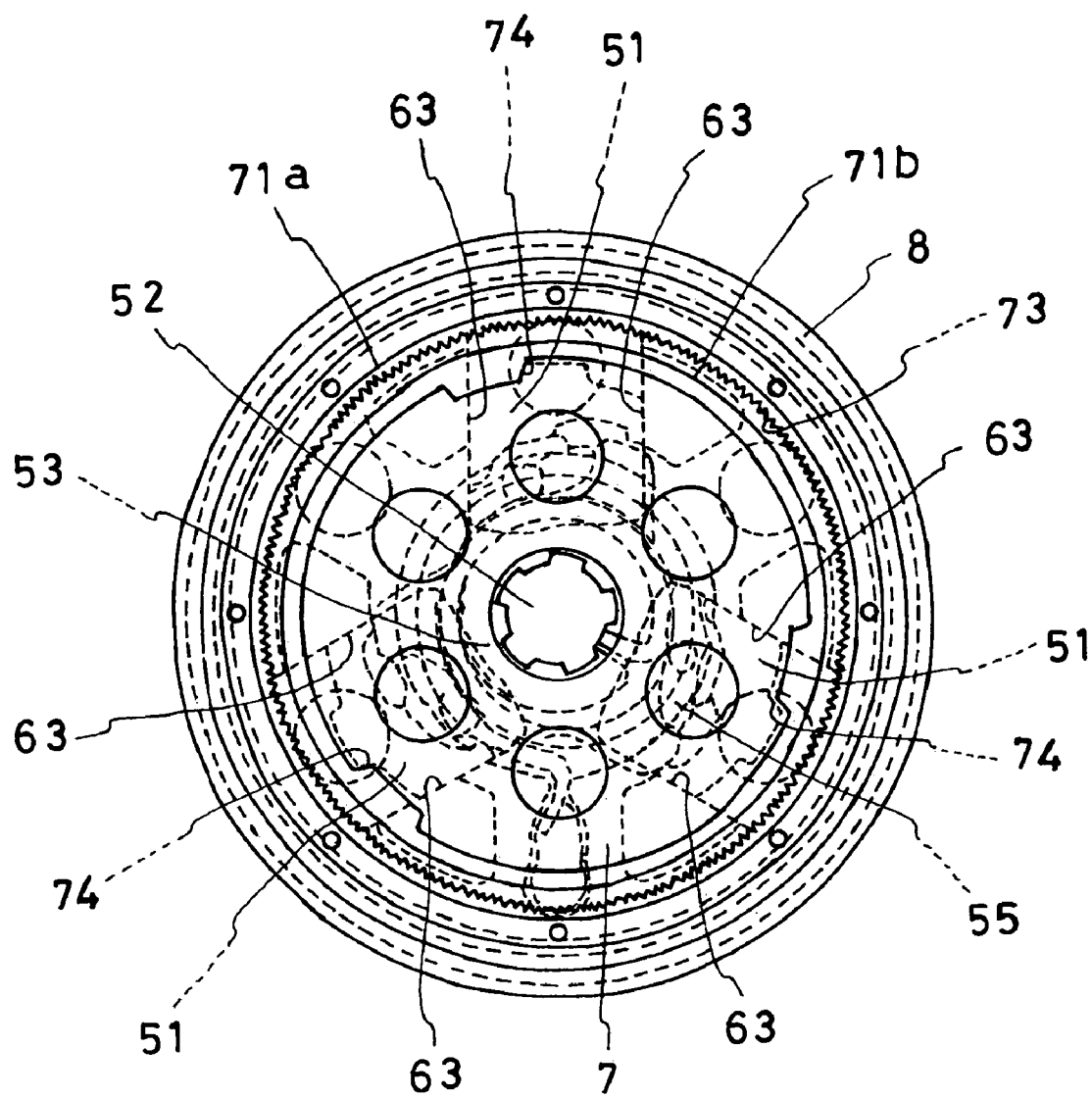
FIG. 5 shows a view seen from the arrow C of FIG. 4.

As is illustrated in FIG. 4 and FIG. 5, the reclining adjuster 5 includes a lower plate 6, an upper plate 7 and three pawls 51.

Figure 6:
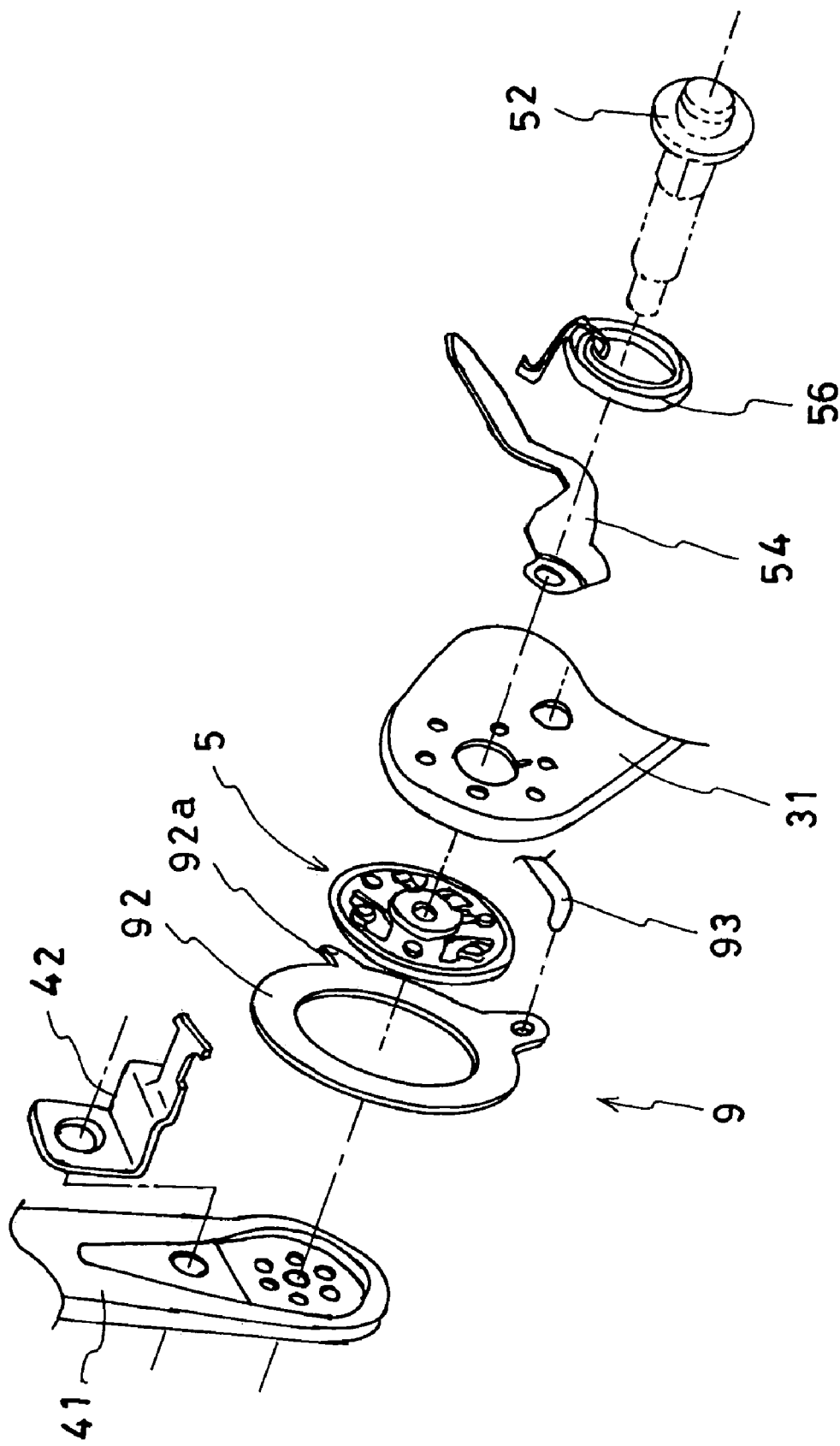
FIG. 6 shows a perspective view of the walk in mechanism of the seat position adjusting device according to the invention.

The lower plate 6 is made of round-shaped board material and is fixed to the frame 31 of the seat cushion 3 by a process such as welding. Moreover, the upper plate 7 is also made of round-shaped board, and is fixed to the frame 41 of the seat back 4 by a process such as welding (as illustrated in FIG. 1 and FIG. 6).

Protruding portion 61 is formed on the lower plate 6 by a process of pressing on an outer side (a right direction in FIG. 4) of the lower plate 6 in a plate-thickness direction (a left-right direction in FIG. 4). The protruding portion 61 form recessed receptacle portion 62 at the lower plate 6, recessed receptacle portion 62 that faces an inner side of the lower plate 6 in a plate-thickness direction. Moreover, a protruding portion 71 (a projected portion) is formed on the upper plate 7 by a process of pressing on an inner side (left side in FIG. 4) of the upper plate 7 in a plate-thickness direction (a left and right direction in FIG. 4). This protruding portion 71 forms a recessed portion 72 on the upper plate 7, on an outer side of the upper plate in a plate-thickness direction (the right side as illustrated in FIG. 4). The recessed receptacle portions 62, 72, respectively on the lower plate 6 and the upper plate 7, are positioned so as to face one another. Thus, the lower plate 6 and the upper plate 7 are rotatably linked by a ring 8 to face one another at outermost circumferences. In this manner, the seat back 4 is rotatably supported in a longitudinal direction relative to the seat cushion 3.

The lower plate 6 and the upper plate 7 formed in this fashion thus form an internal void D in the shape of the recessed receptacle portions 62 and 72. Moreover, the lower plate 6 rotatably supports a rotation shaft 52 around the rotational axis 0 that passes through the upper plate 7 by crossing an internal void D. The rotation shaft 52 supports a cam 53, positioned in the internal void D, so as to rotate integrally.

Three pairs of guiding surfaces 63 are formed, by a process of pressing, in an axial direction, a direction identical to that of a plate-thickness direction, and, moreover, an extending direction of the rotational shaft 52, so as to protrude into the internal void D and face each other at predetermined distances, and so as to be positioned within the recessed receptacle portions 62. These guiding surfaces 63 extend in a radial direction of the lower plate 6. Moreover, a circumferential ratchet 73, which protrudes into the internal void D in a radial direction, is formed, by a process of pressing, on the recessed portions 72 of the upper plate 7 so as to be disposed in the recessed receptacle portions 62.

The three pawls 51 are housed in the internal void D, are slidably guided relative to the guiding surfaces 63 of the lower plate 6 and are disposed so as to be capable of engaging with the circumferential ratchet 73 of the upper plate 7, and so as to face the cam 53. These pawls 51 are pressed from a rear surface by the cam 53 and engage with the ratchet 73; and, as a result of a cam interaction between cam elongated holes 51a, formed at the pawls 51, and projections 53a that have been formed at the cam 53, the pawls 51 slide along the guiding surfaces 63 by virtue of the rotation of the cam 53. By virtue of the engagement between the pawls 51 and the ratchet 73 rotation of the upper plate relative to the lower plate 6 is controlled, and, in consequence, the seat back 4 is maintained at a predetermined inclining angle adjustment position relative to the seat cushion 3.

The rotation shaft 52 supports an operation lever 54 so as to rotate integrally. Moreover, when the operation lever is operated so as to rotate, the cam 53 rotates, together with the rotation shaft 52, in a clockwise direction, as illustrated in FIG. 5; pressing on the pawls 51 by the cam 73 is released, and the pawls 51 slide in a radial inner side direction along the guiding surfaces 63. Thus, engagements between the pawls 51 and the circumferential ratchet 73 are released, and in consequence the upper plate 7 becomes capable of rotating relative to the lower plate 6. Moreover, because the upper plate 7 is made to rotate relative to the lower plate 6 in a state where engagements between the pawls 51 and the circumferential ratchet 73 has been released, the seat back 4 rotates in a seat longitudinal direction relative to the seat cushion 3. Further, the cam 53 is subjected to the biasing force of the spring 55 provided around the rotation shaft 52, and the pawls 51 are consistently biased in a counter clockwise direction, as illustrated in FIG. 5, so as to press the pawls 51 and thus engage with the circumferential ratchet 73. Further, the upper plate 7 is consistently subjected to a biasing force by a spring 56 provided between the upper plate 7 and the lower plate 6 so as to rotate in a seat forward direction relative to the lower plate 6. A bracket 42 is fixed to the frame 41 of the seat back 4 for purposes of engaging the spring 56.

On the protruding portions 71 of the upper plate 7, circumferential stoppers 74 are formed by a pressing process so as to be positioned on the inner side of the circumferential ratchet 73, and thus capable of making contact with the pawls 51 in a circumferential direction, and the circumferential stoppers 74 are disposed within the recessed receptacle portion 62. A maximum rotating angle of the upper plate 7 at the front of the seat relative to the lower plate 6, and a maximum rotating angle of the upper plate 7 at the rear of the seat relative to the lower plate 6, are both controlled as a result of the contact between the stoppers 74 and the pawls 51.

Because, during the formation of the recessed receptacle portion 62 the protruding portion 71 of the upper plate 7 is, as described above, formed by a pressing process of the circumferential ratchet 73 and the circumferential stoppers 74, the external appearance of the protruding portion 71, as is illustrated in FIG. 4, takes the form of round steps 71c, including a first horizontal surface 71a that follows an axial direction to relate to the circumferential ratchet 73, and a second horizontal surface 71b, serving as a supporting surface, that follows an axial direction to relate to the circumferential stopper 74.

Next, an explanation will be offered of the walk-in mechanism 9 that links together the reclining adjuster 5 and the sliding seat adjuster 2.

As is illustrated in FIG. 2 and FIG. 3, on an upper rail 22 of the sliding seat adjuster 2 a second release lever 91 is rotatably supported by a pin 91b. Opposite the second release lever 91, a pressure pin 91a, which pressures the pressing flange 25a of the first release lever 25, is provided between the operating flange 23b of the lock plate 23 and the pressing flange 25a. Further, as is illustrated in FIG. 5 and FIG. 6, on an upper plate 7 of the reclining adjuster 5 a detection plate (a detecting plate) 92 is relatively and rotatably supported by the horizontal surface 71b of the protruding portion 71. At this detection plate 92, an engaging hook 92a is formed so as to protrude in a radial direction. This engaging hook 92a is positioned so as to engage with the bracket 42 of the frame 41 of the seat back 4. When the upper plate 7 rotates at a predetermined angle in a seat forward direction relative to the lower plate 6, the engaging hook 92a engages with the bracket 42. At this time, the upper plate 7 and the detection plate 92 start to rotate together in an identical direction. Moreover, a rod 93 connects the second release lever 91 and the detection plate 92, and the structure is such that the rotation of the detection plate 92 is transmitted to the second release lever 91 through the rod 93.

In this kind of configuration, when the operating lever 54 of the reclining adjuster 5 is operated, and engagements between the pawls 51 and the ratchet 73 are released, the seat back 4, subjected to the biasing force of the spring 56, rotates to a greater degree than a predetermined angle in a seat forward direction relative to the seat cushion 3, the bracket 42 engages with the engaging hook 92a of the detection plate 92 and, together with the upper plate 7, the detection plate 92 rotates in a clockwise direction, as illustrated in FIG. 6. In consequence, the rod 93 is pulled back in a seat rearward direction and the second release lever 91 rotates in a clockwise direction, as illustrated in FIG. 3. The rotation of the second release lever 91 is achieved by rotating the lock plate 23 in an anti-clockwise direction, as shown in FIG. 2, through the pressing flange 25a of the first release lever 25, and engagement between the engaging hook 23a of the lock plate 23 and the lock hole 21b of the lower rail 21 is thereby released. In consequence, the vehicle seat is subjected to the biasing force of the spring and slides in a vehicle forward direction relative to the vehicle floor.

As has been described above, the detection plate 92 of the walk-in mechanism 9 is supported by the second horizontal surface 71b of the upper plate 7 of the reclining adjuster 5, and the reclining adjuster 5 and the detection plate 92 are positioned on an identical surface in an axial direction. In consequence, in comparison with related art, it is possible to position the detection plate 92 without space in an axial direction being sacrificed, and it is thus possible to use effectively the space within a vehicle compartment. Further, because the second horizontal surface 71b that supports the detection plate 92 is formed within the protruding portions 71 that form the recessed receptacle portions 72 of the upper plate 7, special processing does not need to be carried on the upper plate 7 for the detection plate 92 to be supported by the upper plate 7, and it is accordingly possible to achieve a simple structure at a modest cost.

In the configuration of this embodiment, the detection plate 92 is supported by the second horizontal surface 71b of the upper plate 7, but it is also possible for the detection plate 92 to be supported by the first horizontal surface 71a, or, alternatively, by the outer circumferential surface of the ring 8 and the outer circumferential surface of the protruding portion 61 of the lower plate 6.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle seat position adjusting device, comprising:
    a slide adjuster having a slide lock mechanism for slidably supporting a vehicle seat relative to a vehicle floor and holding the vehicle seat at a predetermined position relative to the vehicle floor by restricting a relative sliding movement of the vehicle seat relative to the vehicle floor;
    a reclining adjuster for rotatably supporting a seat back of the vehicle seat about a shaft, relative to a seat cushion of the vehicle seat and for adjusting the seat back of the vehicle seat to a desired angular position relative to the seat cushion of the vehicle seat; and
    a walk-in mechanism disposed between the slide adjuster and the reclining adjuster for actuating the slide lock mechanism of the slide adjuster to allow the sliding movement of the vehicle seat relative to the vehicle floor when the seat back is rotated equal to or more than a predetermined angle relative to the seat cushion by operating the reclining adjuster,
    wherein the walk-in mechanism includes a detecting plate for detecting the predetermined angle or more than the predetermined angle rotation of the seat back relative to the seat cushion and
    wherein the reclining adjuster includes a lower plate adapted to be fixed to a frame of the seat cushion, an upper plate adapted to be fixed to a frame of the seat back and rotatably supported on the lower plate, and a circumferential supporting surface rotatably supporting the detecting plate thereon, the circumferential supporting surfacing being formed in the upper plate or the lower plate to surround the shaft.

2. A vehicle seat position adjusting device according to claim 1, wherein
    the reclining adjuster includes a reclining lock mechanism disposed between the lower plate and the upper plate and restricting a rotation of the upper plate relative to the lower plate, a recessed receptacle portion formed at one of the upper plate and the lower plate for receiving the reclining lock mechanism at an inner surface opposing the other of the upper plate and the lower plate and a projected portion forming the supporting surface of the reclining adjuster for supporting the detecting plate at an outer surface opposite side to a surface opposing the other of the upper plate and the lower plate.

3. A vehicle seat position adjusting device according to claim 2, wherein
the upper plate is formed with the projected portion in a thickness direction and the detecting plate is relatively rotatably supported at a horizontal plane of the upper plate.

4. A vehicle seat position adjusting device according to claim 1, wherein the supporting surface formed in the upper plate or the lower plate rotatably supports the detecting plate without increasing an axial width of the vehicle seat position adjusting device.

5. A vehicle seat position adjusting device according to claim 1, wherein the supporting surface is located between the frame of the seat back and the frame of the seat cushion.

6. A vehicle seat position adjusting device according to claim 1, wherein the supporting surface is arranged at an outer profile of the reclining adjuster.

7. A vehicle seat position adjusting device according to claim 6, wherein the supporting surface is formed on a projected portion which projects from the upper plate or the lower plate in a thickness direction.

8. A vehicle seat position adjusting device comprising:
a slide adjuster having a slide lock mechanism for slidably supporting a vehicle seat relative to a vehicle floor and holding the vehicle seat at a predetermined position relative to the vehicle floor by restricting a relative sliding movement of the vehicle seat relative to the vehicle floor;
a reclining adjuster for rotatably supporting a seat back of the vehicle seat about a shaft, relative to a seat cushion of the vehicle seat and for adjusting the seat back of the vehicle seat at a desired angular position relative to the seat cushion of the vehicle seat; and
a walk-in mechanism disposed between the slide adjuster and the reclining adjuster for actuating the slide lock mechanism of the slide adjuster to allow the sliding movement of the vehicle seat relative to the vehicle floor when the seat back is rotated equal to or more than a predetermined angle relative to the seat cushion by operating the reclining adjuster,
wherein the walk-in mechanism includes a detecting plate for detecting the predetermined angle or more than the predetermined angle rotation of the seat back relative to the seat cushion; and
wherein the reclining adjuster includes a circumferential supporting surface mounting the detecting plate thereon; surrounding the shaft, and arranged at an outer profile of the reclining adjuster, the supporting surface being located between a frame of the seat cushion and a frame of the seat back in parallel to an extension direction of the rotation axis line of the seat back relative to the seat cushion.

9. A vehicle seat position adjusting device according to claim 8, wherein
the supporting surface is formed on a projected portion which projects from the upper plate or the lower plate in its thickness direction.

10. A vehicle seat position adjusting device according to claim 8, wherein the supporting surface supports the walk-in mechanism detecting plate between the frame of the seat cushion and the frame of the seat back so as to avoid increasing an axial width of the vehicle seat position adjusting device.

* * * * *